June 10, 1924.                                              1,497,592
F. T. ROBERTS
MOLD FOR MAKING HOLLOW RUBBER ARTICLES
Original Filed March 12, 1918    2 Sheets-Sheet 1

Inventor;
Fred Thomas Roberts,
By Bates & Macklin,
Attys.

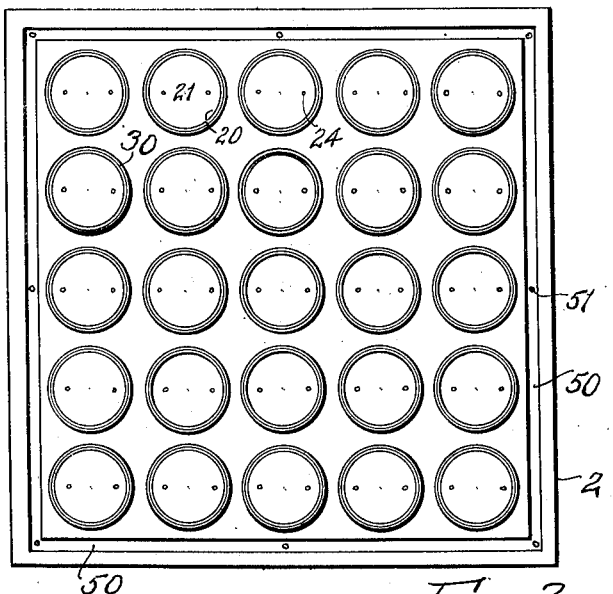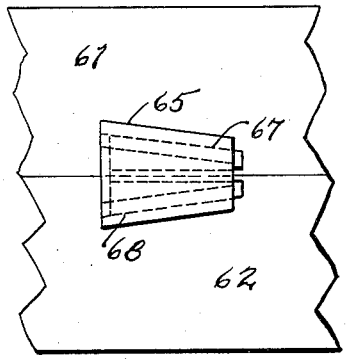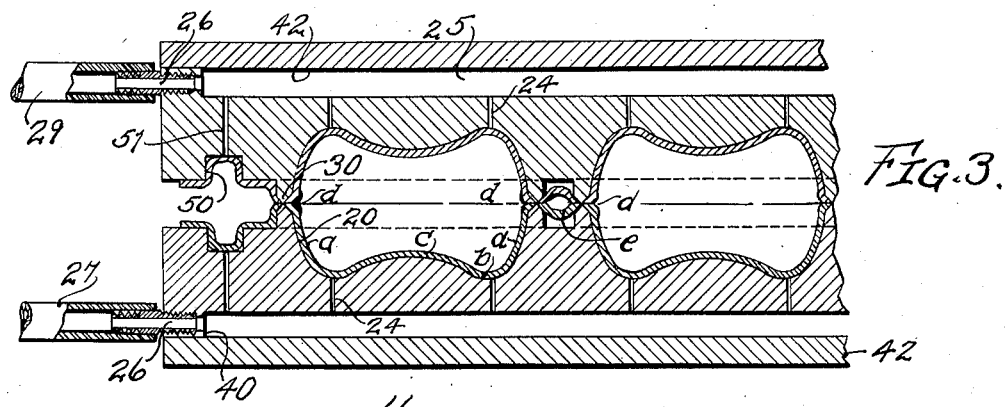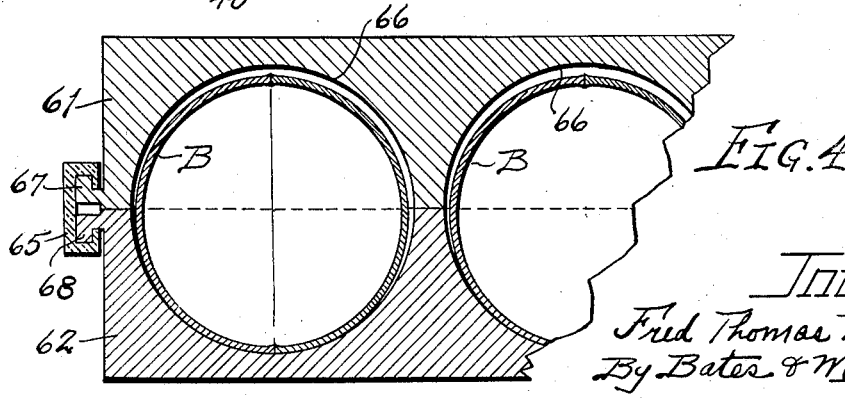

Patented June 10, 1924.

1,497,592

UNITED STATES PATENT OFFICE.

FRED THOMAS ROBERTS, OF UPPER MONTCLAIR, NEW JERSEY, ASSIGNOR TO PARAMOUNT RUBBER CONSOLIDATED, INC., OF PHILADELPHIA, PENNSYLVANIA, A CORPORATION OF DELAWARE.

MOLD FOR MAKING HOLLOW RUBBER ARTICLES.

Application filed March 12, 1918, Serial No. 552,639. Renewed April 14, 1922.

*To all whom it may concern:*

Be it known that I, FRED THOMAS ROBERTS, a citizen of the United States, residing at Upper Montclair, in the county of Essex and State of New Jersey, have invented a certain new and useful Improvement in Molds for Making Hollow Rubber Articles, of which the following is a full, clear, and exact description, reference being had to the accompanying drawings.

This invention relates to molds for making hollow rubber articles, and among its objects are; the provision in such a mold of means (in the nature of a channel entirely surrounding the cavity or cavities in the mold plate) for pneumatically holding or clamping the stock in close engagement with the mold around the mold cavity, whereby the application of a preponderance of pneumatic pressure on the stock outside of the mold may force the stock into the cavity without danger of distortion or wrinkling of the stock at the edges of the cavity. A feature of this arrangement is that the means for causing a relative vacuum beneath the stock within the cavities may be connected to the same source as the pneumatic clamping means.

The present invention is hereinafter more fully described in connection with the accompanying drawings and the essential characteristics are summarized in the claims.

Figure 1:
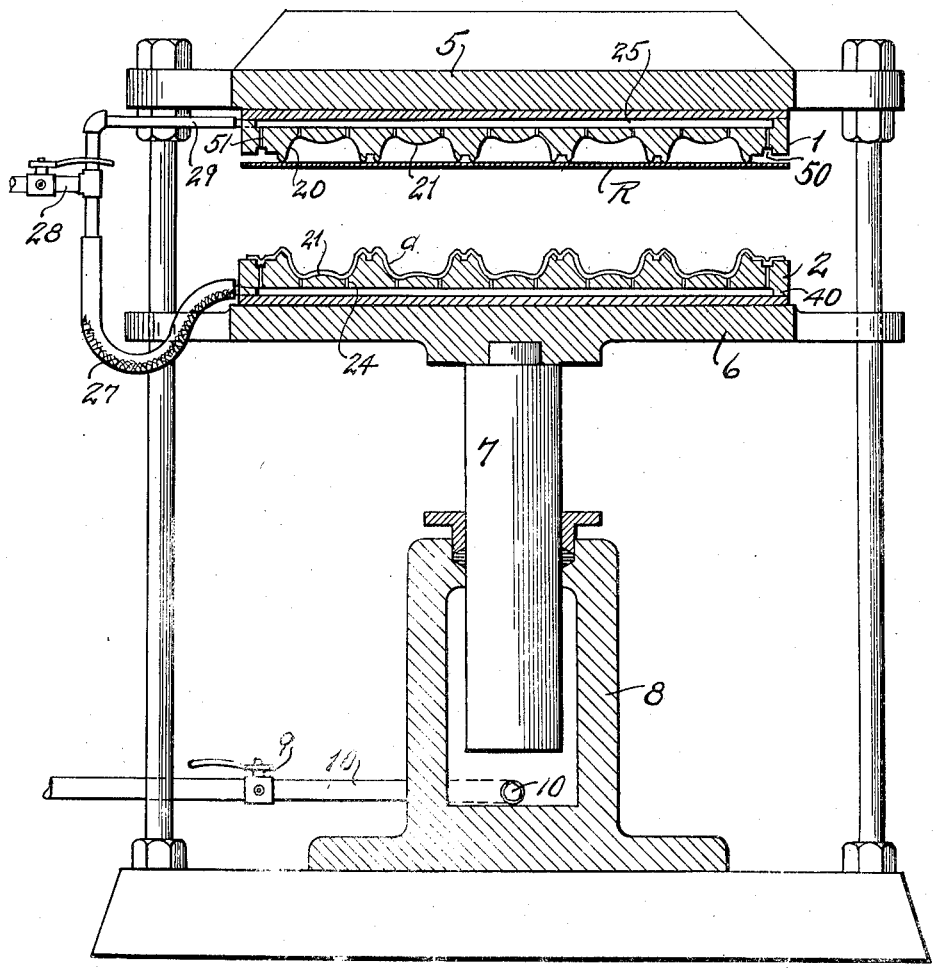
Figure 6:
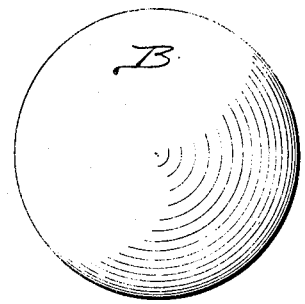

In the drawings, Fig. 1 is a transverse section through a pair of mold members embodying my invention and shown as mounted in a suitable press for operating the same; Fig. 2 is a plan of one of such mold plates; Fig. 3 is an enlarged transverse section through the mold members showing the rubber stock in place therein after the mold parts have been brought together; Fig. 4 is a sectional view on the same scale as Fig. 3 showing a vulcanizing mold which may be employed for treating the article formed in my mold; Fig. 5 is a detail of the clamping device for the mold shown in Fig. 4; Fig. 6 is an outside view of a ball produced by the molds shown.

Describing the parts by the use of reference numerals, 1 and 2 indicate the upper and lower mold members in which are formed a plurality of cavities. These members are preferably in the nature of large mold plates which may be carried by the stationary and movable platens 5 and 6 of a suitable press (Fig. 1) the movable platen being raised toward the upper platen by a plunger 7 in the cylinder 8 by the water forced through the pipe 10 under control of a valve 9.

To save expense and difficulties of forming the stock of irregular thickness to allow for greater stretching in the central region, I may arrange the mold cavities as shown in the drawings, with a substantially spherical surface extending downwardly at 20 and then curving inwardly to an inward protuberance 21, the major portion of which is also spherical. The area of the surface thus formed is equal to the area of the finished distended article. When the rubber is drawn into such a mold, the central portion of the stock engages the spherical surface of the protuberance before it is stretched to a greater extent than the stock adjacent the edges of the mold. Further stretching into the easy curve by which the sides of the cavity merge with the central spherical zone stretches the rubber but slightly more, with a result that when the article is forced completely to its seat, it is of substantially the same thickness throughout and of the proper size to become a sphere without perceptible stretching.

To cause the rubber to be forced to its seat by the use of pneumatic pressure, it is desirable to exhaust the air from beneath the rubber. To accomplish this, I provide passages 24 connecting the lower portion of the cavity with a chamber 25 formed in the mold member from which leads a passage 26 connected with a flexible tubular member 27, leading to a vacuum pipe 28 connected with a suitable pump, not shown. The upper mold member is not movable when used with a press, and its cavity 25 may be connected with a pipe 29.

To enable the suction to effectively seat the rubber stock in the mold cavities it is important to bind the rubber to the mold outside of the cavities. I accomplish this by forming in the face of the mold a groove or channel 50 which surrounds the set of cavities, and to which suction is applied to draw the border of the sheet tightly against the mold. I prefer to connect the groove 50 with the suction chamber 25 by passageways 51, so that one suction chamber will serve for the cavities and the groove.

The mold plates are shown as cut away to leave raised ribs around the edges of the molds which ribs are beveled each way forming knife edges 30 adapted to sever the stock within the mold from the surrounding sheet when the mold members are brought together. As a convenient method of constructing the mold plates to provide the chamber 25 and allow for readily drilling the passages 24, the mold members proper are provided with ribs 40 around the perimeter of the members on the sides opposite the cavities. These ribs may be readily machined and the space within the same enclosed by suitable plates 42.

The convenient method of using the molds described, is to place rubber sheets, such as R, Fig. 1, over the mold cavities bringing the edges of the sheet downwardly to close the channel 50 which surround all the cavities and is connected by passages 51 with the chamber 25 whereupon the vacuum passages may be opened thus tightly drawing the edge of the rubber into these grooves and in effect, pneumatically clamping the same over the surface of the mold members and across the mold cavities. A continued application of atmospheric pressure by reason of vacuum within the chamber forces the rubber into the cavities as shown in the lower mold, Fig. 1, the rubber lying closely in contact at a, with the spherical surface 20 and curving at b toward the portion c, covering the spherical protuberance in the cavity.

The mold members may now be brought forcibly together bringing the cutting edges 30 into contact severing the rubber around the cavities, the rubber between the cavities merely being forced into the space between the raised cutting edges as indicated in Fig. 3 at e.

Before bringing the molds together, suitable expansible material such as ammonia powder may be introduced in the rubber within the cavity so that subsequent heating may cause expansion of the article into close contact with the wall of the vulcanizing mold cavity in a well known manner, or the members may be brought together in an atmosphere of compressed air, entrapping such compressed air therein, which may provide the desired internal pressure for vulcanization, as well as lending resiliency to the finished article.

The latter method mentioned is fully described and claimed in my prior Patent No. 1,146,523, granted July 13, 1915.

After the molds have been brought together, severing the articles within the cavities from within the surrounding sheet, these articles may be removed and placed in spherical cavities 66 formed in separable mold members 61 and 62, comprising the vulcanizing mold. These vulcanizing molds may be suitably secured together as shown. I have provided a suitable clamp consisting of a wedge-shaped stirrup 65 overhanging wedge-shaped outwardly projecting ribs 67 and 68 rigid with the mold members 61 and 62, respectively.

In Fig. 4 the articles designated B, are shown as slightly smaller than the cavities they occupy but as expanded from the shape given them in the forming mold to substantially spherical form. The article will assume this shape at once, as internal pressure is provided by imprisoning air under pressure or in case the expansible material such as ammonia powder is used, the articles may be placed in the cavity 66 in substantially the shape given them by the forming molds in which case Fig. 4 would represent a condition obtained after the vulcanization had started and a certain pressure had been generated within the balls B.

The continued subsequent expansion of the ball to bring the surface into close contact with the cavities forces the air outside the ball within the cavity outwardly between the contacting surfaces of the mold members.

After vulcanization the exterior of the article appears very smooth and its spherical shape illustrated in Fig. 6 is permanently retained.

This application is a continuation in part of my co-pending application No. 154,072 filed March 12, 1917 (now Patent No. 1,346,848 issued July 20, 1920) which shows a mold cavity surrounded by a suction clamping groove, and from which prior application some of the claims in this case have been transferred. Attention should also be called to my co-pending application No. 323,851 filed September 15, 1919, for claims relating to the combination of a suctional mold cavity surrounded by a raised cutting edge.

Having thus described my invention, what I claim is:—

1. The combination of a mold for hollow rubber articles of convex exterior, the mold cavities having a fixed inward protuberance, passages leading from the cavities, means connected with the passage for exhausting the cavities, and a channel surrounding the cavities and connected with said exhausting means.

2. The combination of a mold having a cavity, a channel in the face of the mold outside of the cavity, and means for exhausting air from the channel to enable it to hold a sheet of material by suction.

3. The combination of a mold having a cavity, a channel surrounding the cavity, and means for exhausting air from the channel.

4. The combination of a mold having a cavity, a channel in the face of the mold surrounding the cavity, and means for exhausting air from the channel and cavity.

5. The combination of a mold having a series of cavities, a channel in the face of the mold extending in a circuit about the series of cavities, and means for exhausting air from the channel to suctionally hold a sheet of rubber across the various cavities.

6. The combination of a mold for hollow rubber articles, said mold having a cavity, a channel in the face of the mold outside of the cavity, a passageway communicating with both the cavity and the channel, and means for exhausting air from said passageway.

7. The combination of a mold for hollow rubber articles, said mold having a series of cavities, a channel in the face of the mold forming a circuit about the various cavities, a recess in the base of the mold, passageways through the mold body from the cavities and channel to said recess, and means for exhausting air from the recess.

8. The combination of a mold having a cavity, a channel in the face of the mold outside of the cavity, a passageway leading to the channel and the cavity, a platen carrying all of the parts mentioned, a plunger for operating the platen, and a flexible pipe connected to the common passageway carried by the mold.

9. The combination of a mold having a series of cavities, a channel in the face of the mold extending about the series of cavities, a recess in the base of the mold, passageways through the body of the mold from the channel and cavities to said recess, a movable platen carrying the mold mentioned, means for moving the platen, and a flexible pipe communicating with the recess in the mold base.

10. The combination of a mold having a cavity, an annular cutting edge, surrounding the cavity, an annular channel in the face of the mold outside of the cavity, and means for exhausting air from said channel.

11. A mold having a series of cavities in its face, each cavity being surrounded by an annular cutting edge, a channel in the face of the mold forming a circuit about the set of cavities, there being space around each cutting edge for surplus rubber, and means for exhausting air from the channel.

12. An apparatus for forming hollow rubber articles including a pair of mold members having registering cavities and passages for applying vacuum to the low portion of the cavities grooves in the mold members around the cavities, and vacuum passages leading thereto, whereby rubber sheets may be securely held to the face of the mold members across the cavities by the vacuum in such grooves while the sheets are drawn by vacuum into the cavities.

13. A mold for making hollow rubber articles comprising a pair of members each having cavities for forming a portion of the article, cutting edges surrounding the mold cavities, grooves surrounding the mold cavities and vacuum passages leading to the cavities and to the grooves.

14. In an apparatus for making rubber articles, the combination of a cavitary mold, a groove in the mold surrounding the cavity, means for establishing a superior pneumatic pressure on the face of rubber stock opposite the groove, whereby it is temporarily fastened to the mold.

15. In an apparatus for making hollow rubber articles, the combination of a mold member having a cavity, a groove surrounding the cavity, means for exhausting the air from the groove.

16. In an apparatus for making hollow rubber articles, the combination of a mold member having a cavity, a groove outside of the cavity, means for exhausting the cavity and groove.

17. In an apparatus for making articles of plastic material, the combination of a mold member having a cavity, passageways in the mold member terminating at the face thereof outside of the cavity, and means for exhausting air from the passageways.

18. In an apparatus for making hollow articles of plastic material, the combination of a mold member having a cavity, a passageway leading from the cavity, a passageway leading from the face of the mold in a region outside of the cavity, and means for establishing a superior pneumatic pressure on the side of the plastic material opposite the cavity and opposite said region.

19. In an apparatus for making hollow articles of plastic material, the combination of a mold member having a cavity, means for pneumatically seating plastic stock in the cavity, and means for pneumatically clamping the marginal portions of the stock outside of the cavity.

20. An apparatus for making articles having protuberances therein comprising means for supporting a sheet of material in planer form upon a mold, means for establishing a superior air pressure on one face of the sheet to hold the sheet upon the mold and for thereafter causing the sheet to be disposed in the mold to form the protuberances therein.

21. In an apparatus for changing sheet stock from a planer form to a protuberant form, the combination of a mold member having a part therein adapted to form the protuberant portion, means communicating with said part adapted to seat the sheet stock therein by pneumatic pressure, and pneumatic clamping means associated with said mold member and adapted to hold the marginal portion of the sheet stock in position while the protuberant portion is being formed.

22. In an apparatus for making articles, having relief formations from flat stock, the combination of a mold member having parts thereof adapted to form the relief portions, portions of said mold member having pneumatic clamping means whereby the sheet stock is held in position while the relief formations are being produced.

23. An apparatus for making articles having relief formations thereon comprising means for supporting flat sheet material on a mold provided with relief formations, means for establishing a superior air pressure on portions of one face of the sheet to hold the latter upon the mold and means for creating differences in air pressure to cause the sheet to be disposed on the mold to produce relief formations.

In testimony whereof, I hereunto affix my signature.

FRED THOMAS ROBERTS.